United States Patent
Robinson et al.

(10) Patent No.: US 12,554,859 B2
(45) Date of Patent: Feb. 17, 2026

(54) GENERATING 3-DIMENSIONAL MODELS AND CONNECTIONS TO PROVIDE VULNERABILITY CONTEXT

(71) Applicant: INTERNATIONAL BUSINESS MACHINES CORPORATION, Armonk, NY (US)

(72) Inventors: Nikki Elyse Robinson, Davidsonville, MD (US); Dimple Gajra, Austin, TX (US); Caroline Chen Lee, Watertown, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 18/342,441

(22) Filed: Jun. 27, 2023

(65) Prior Publication Data
US 2025/0005165 A1 Jan. 2, 2025

(51) Int. Cl.
*G06F 21/57* (2013.01)
*G06F 30/10* (2020.01)

(52) U.S. Cl.
CPC ............ *G06F 21/577* (2013.01); *G06F 30/10* (2020.01); *G06F 2221/034* (2013.01)

(58) Field of Classification Search
CPC ... G06F 21/577; G06F 30/10; G06F 2221/034
See application file for complete search history.

(56) References Cited

U.S. PATENT DOCUMENTS 10,592,405 B2  3/2020  Duer et al.
2011/0277034 A1* 11/2011  Hanson ................. G06F 21/554
                                                    709/224

(Continued)

FOREIGN PATENT DOCUMENTS

CN  103699787 A  4/2014
CN  106097299 A  11/2016

(Continued)

OTHER PUBLICATIONS

"10 + Best Software for AR and VR Design in 2023", Just Creative, Mar. 30, 2023, 23 pp., [online][retrieved May 8, 2023] https://justcreative.com/best-software-for-ar-and-vr-design/.
"Designing VR & AR simplified", Tvori, 9 pp., [online][retrieved May 8, 2023] https://tvori.co/tvori.

(Continued)

*Primary Examiner* — Linglan Edwards
*Assistant Examiner* — Kamryn J Gillespie
(74) *Attorney, Agent, or Firm* — Konrad, Raynes, Davda & Victor, LLP; Janaki K. Davda (57) ABSTRACT

Provided are techniques for generating 3-dimensional (3D) models and connections to provide vulnerability context. For a first vulnerability of a first asset, first vulnerability data comprising first vulnerability attributes is retrieved. A second vulnerability of a second asset is identified based on the second vulnerability having second vulnerability data comprising second vulnerability attributes that include one or more common vulnerability attributes with the first vulnerability attributes. Anchor points for the first vulnerability and the second vulnerability are created based on the one or more common vulnerability attributes. A first 3-dimensional (3D) model is generated for the first vulnerability that incorporates the first vulnerability attributes, and a second 3D model is generated for the second vulnerability that incorporates the second vulnerability attributes. The first 3D model and the second 3D model are displayed with one or more connections based on the anchor points.

20 Claims, 7 Drawing Sheets

(56) References Cited

U.S. PATENT DOCUMENTS

| | | | |
|---|---|---|---|
| 2017/0098087 A1* | 4/2017 | Li | H04L 63/1416 |
| 2019/0166149 A1 | 5/2019 | Gerrick | |
| 2021/0240496 A1* | 8/2021 | Hamdi | G06F 21/552 |
| 2021/0240591 A1* | 8/2021 | Hamdi | G06F 11/3433 |
| 2021/0243223 A1 | 8/2021 | Arora et al. | |
| 2022/0131887 A1* | 4/2022 | Ngweta | H04L 63/1433 |
| 2022/0237764 A1* | 7/2022 | Mullet | G06Q 50/16 |
| 2022/0345483 A1* | 10/2022 | Shua | H04L 9/0825 |
| 2023/0300165 A1* | 9/2023 | Fricano | H04L 63/20 726/25 |
| 2025/0023714 A1* | 1/2025 | Kumar | H04L 9/0819 |

FOREIGN PATENT DOCUMENTS

| | | |
|---|---|---|
| CN | 104156507 B | 5/2017 |
| CN | 104881606 B | 12/2017 |
| CN | 106897510 B | 1/2020 |
| CN | 114529676 A | 5/2022 |
| CN | 113259334 B | 6/2022 |
| JP | 2015219665 A | 12/2015 |

OTHER PUBLICATIONS

"Unlock your Creativity", Unity, 12 pp., [online][retrieved May 8, 2023] https://unity.com/download.

"Augmented Reality it's everything you imagined", Adobe, 14 pp., [online][retrieved May 30, 2023]https://www.adobe.com/in/products/aero.html?clickref=1100lwiimkAb&mv=affiliate&mv2=pz&as_camptype=adobeaero&as_channel=affiliate&as_source=partnerize&as_campaign=justcreative22.

"Develop AR Experiences with Vuforia Engine", PTC Products, 6 pp., [online][retrieved May 8, 2023] https://www.ptc.com/en/products/vuforia/vuforia-engine.

"Painting from a new perspective", Google, 12 pp., [online][retrieved May 8, 2023] https://www.tiltbrush.com.

"Common Vulnerabilities and Exposures", Wikipedia, 6 pp., [online][retrieved Jun. 8, 2023] https://en.wikipedia.org/wiki/Common_Vulnerabilities_and_Exposures.

"Geometeric Dimensioning and talerancing", Wikipedia, 6 pp., [online][retrieved Jun. 7, 2023] https://en.wikipedia.org/wiki/Geometric_dimensioning_and_tolerancing.

"Process", CVE, 3 pp., [online][retrieved Jun. 8, 2023] https://www.cve.org/About/Process.

* cited by examiner

GENERATING 3-DIMENSIONAL MODELS AND CONNECTIONS TO PROVIDE VULNERABILITY CONTEXT

BACKGROUND

Embodiments of the invention relate to generating 3-dimensional (3D) models and connections between the 3D models to provide vulnerability context.

Vulnerabilities may be described as weaknesses or flaws in a computing system (e.g., with security procedures, internal controls, etc.) that may be exploited (e.g., to gain access to the computing system). In addition, a common problem in the cybersecurity industry is that vulnerability management and scoring systems are very complicated. Also, in large and complex environments (e.g., using containers, multi-cloud deployments or open-source software implementations), vulnerability management may be even more complicated.

Often, vulnerabilities are currently viewed in a text format, limiting the amount of information a system or application owner will read about any given vulnerability. Also, the vulnerability details are often complex, multi-page, and full of information that leads to other websites. For example, some vulnerability details include links from a product site, a vendor site, and other websites as well. It is cumbersome for systems administrators and Information Technology (IT) management to try to read and research every vulnerability. Also, with new vulnerabilities being constantly released, it is difficult to read the text on vulnerability details or understand them in depth.

SUMMARY

In accordance with certain embodiments, a computer-implemented method comprising operations is provided for generating 3D models and connections between the 3D models to provide vulnerability context. In such embodiments, for a first vulnerability of a first asset, first vulnerability data comprising first vulnerability attributes is retrieved. A second vulnerability of a second asset is identified based on the second vulnerability having second vulnerability data comprising second vulnerability attributes that include one or more common vulnerability attributes with the first vulnerability attributes. Anchor points for the first vulnerability and the second vulnerability are created based on the one or more common vulnerability attributes. A first 3-dimensional (3D) model is generated for the first vulnerability that incorporates the first vulnerability attributes of the first vulnerability, and a second 3D model is generated for the second vulnerability that incorporates the second vulnerability attributes of the second vulnerability. The first 3D model and the second 3D model are displayed with one or more connections based on the anchor points.

In accordance with other embodiments, a computer program product comprising a computer readable storage medium having program code embodied therewith is provided, where the program code is executable by at least one processor to perform operations for generating 3D models and connections between the 3D models to provide vulnerability context. In such embodiments, for a first vulnerability of a first asset, first vulnerability data comprising first vulnerability attributes is retrieved. A second vulnerability of a second asset is identified based on the second vulnerability having second vulnerability data comprising second vulnerability attributes that include one or more common vulnerability attributes with the first vulnerability attributes. Anchor points for the first vulnerability and the second vulnerability are created based on the one or more common vulnerability attributes. A first 3-dimensional (3D) model is generated for the first vulnerability that incorporates the first vulnerability attributes of the first vulnerability, and a second 3D model is generated for the second vulnerability that incorporates the second vulnerability attributes of the second vulnerability. The first 3D model and the second 3D model are displayed with one or more connections based on the anchor points.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for generating 3D models and connections between the 3D models to provide vulnerability context. In such embodiments, for a first vulnerability of a first asset, first vulnerability data comprising first vulnerability attributes is retrieved. A second vulnerability of a second asset is identified based on the second vulnerability having second vulnerability data comprising second vulnerability attributes that include one or more common vulnerability attributes with the first vulnerability attributes. Anchor points for the first vulnerability and the second vulnerability are created based on the one or more common vulnerability attributes. A first 3-dimensional (3D) model is generated for the first vulnerability that incorporates the first vulnerability attributes of the first vulnerability, and a second 3D model is generated for the second vulnerability that incorporates the second vulnerability attributes of the second vulnerability. The first 3D model and the second 3D model are displayed with one or more connections based on the anchor points.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as transitory in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
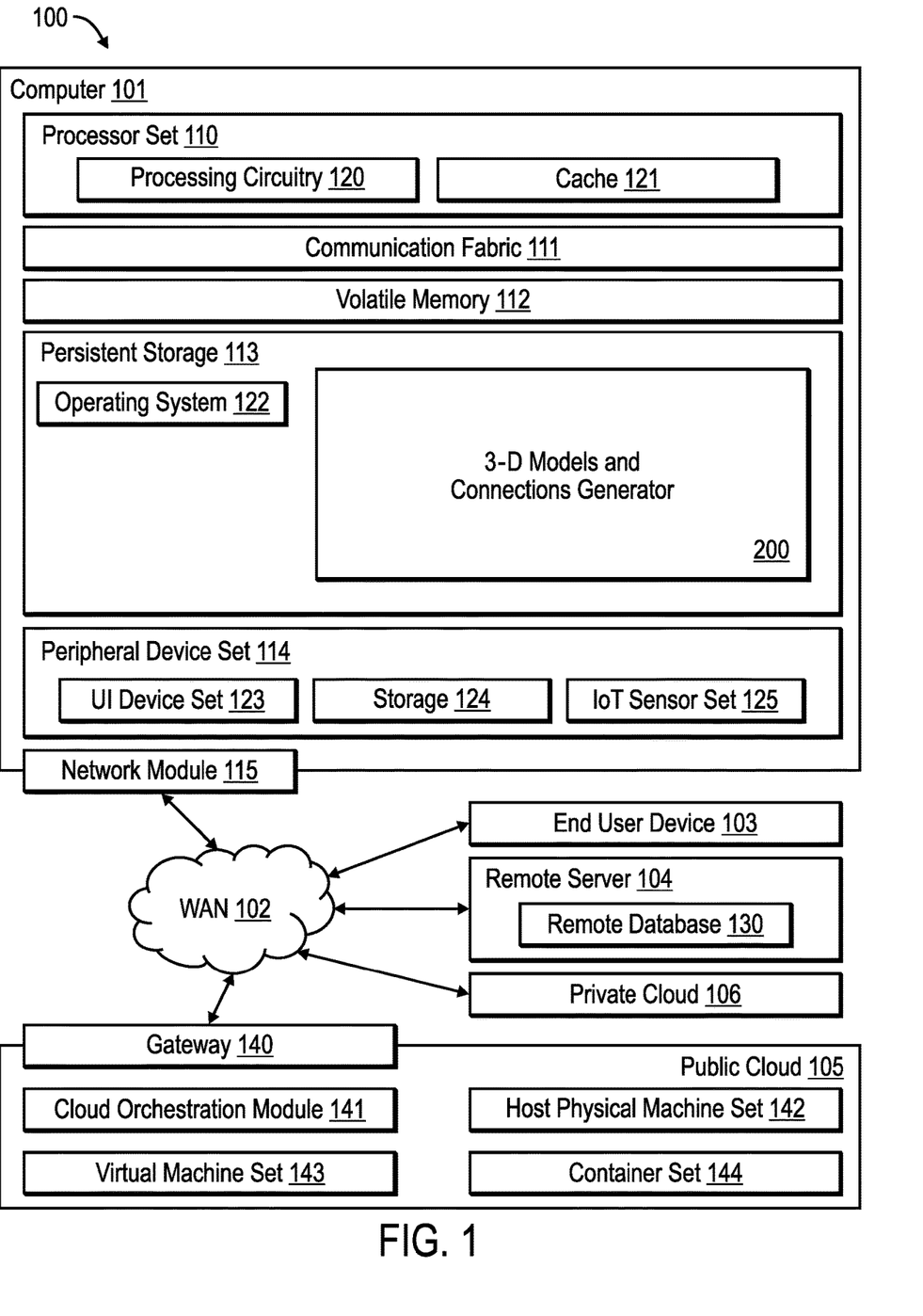
FIG. 1 illustrates a computing environment in accordance with certain embodiments.

FIG. 1 illustrates a computing environment 100 in accordance with certain embodiments. Computing environment 100 contains an example of an environment for the execution of at least some of the computer code involved in performing the inventive methods, such as 3D model and connection generator 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
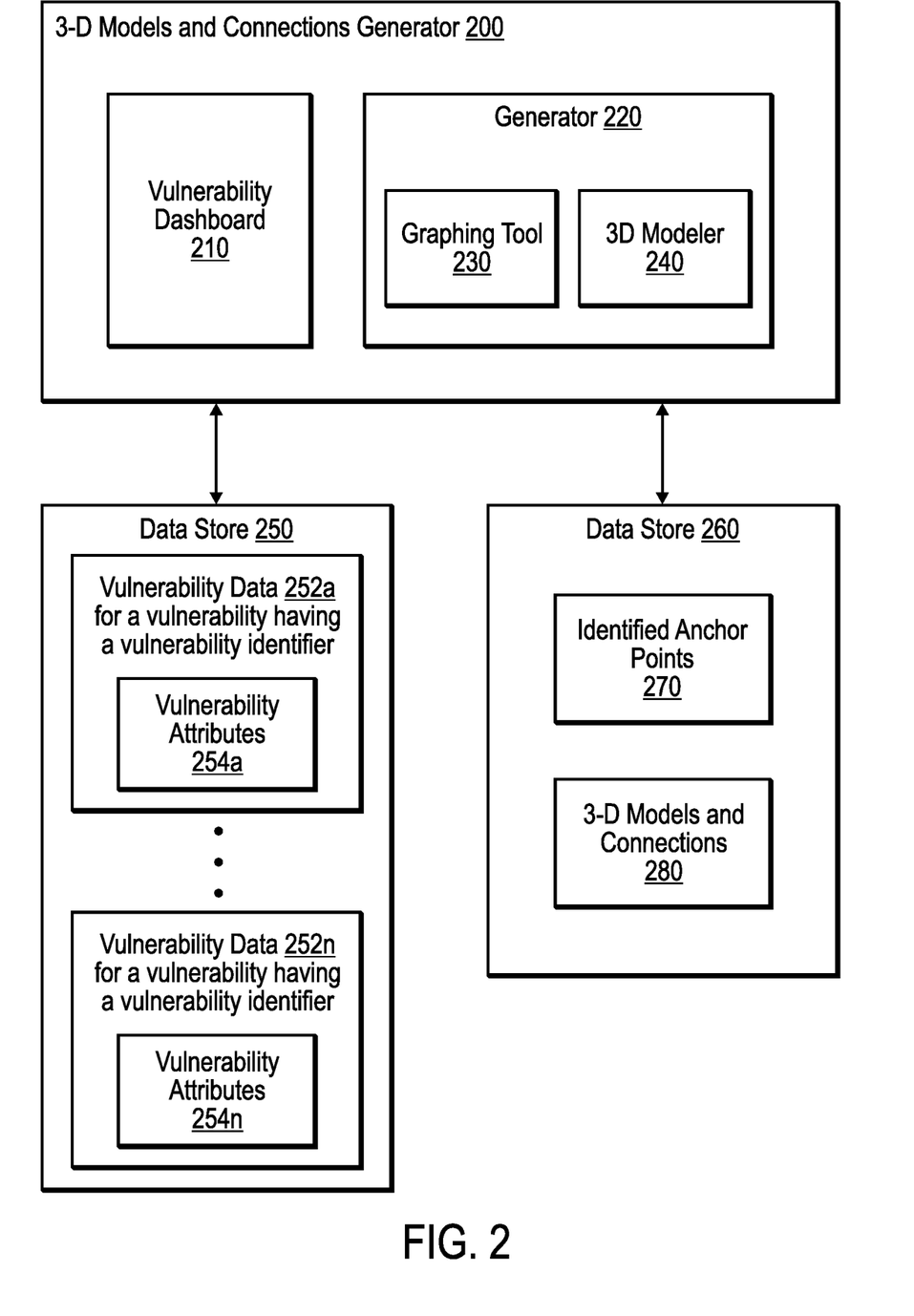
FIG. 2 illustrates, in a block diagram, a computing environment for a 3D model and connection generator in accordance with certain embodiments.

FIG. 2 illustrates, in a block diagram, a computing environment for a 3D model and connection generator in accordance with certain embodiments. The 3D model and connection generator 200 includes a vulnerability dashboard 210 and a generator 220. The generator 220 may invoke or implement a graphing tool 230 and/or a 3D modeler 240. The 3D model and connection generator 200 is connected to a data store 250 and to a data store 260. The data store 250 (e.g., a database) stores vulnerability data $252a \ldots 252n$ for each vulnerability, where each vulnerability may have a vulnerability identifier. Each set of vulnerability data $252a \ldots 252n$ stores vulnerability attributes $254a \ldots 254n$ along with the vulnerability (e.g., a name or a phrase for the vulnerability) and/or the vulnerability identifier. The data store 260 stores identified anchor points 270 and 3D models and connections 280 (e.g., the information used to render (display) the 3D models and connections). Connections may also be referred to as links or chains. Anchor points may also be referred to as hooks. The vulnerability attributes $254a \ldots 254n$ may be variables.

The components 210, 220, 230, 240, 250 used by the 3D model and connection generator 200 are integrated so that the information may be passed and parsed among the components 210, 220, 230, 240, 250.

In certain embodiments, the 3D model and connection generator 200 allows effective viewing and remediation of vulnerabilities. In certain embodiments, the 3D model and connection generator 200 generates a 3D model for each of multiple vulnerabilities, while in other embodiments, the 3D model and connection generator 200 generates a 3D model for combinations of (i.e., subsets of) the vulnerabilities. In addition, the 3D model and connection generator 200 displays the 3D models with connections between them. In this way, the 3D model and connection generator 200 enables vulnerabilities to be viewed in a 3D context, with the connections showing which vulnerabilities are connected. The 3D model and connection generator 200 allows users to see comprehensive and contextualized vulnerability data $252a \ldots 252n$ in a 3D format. In certain embodiments, the 3D model and connection generator 200 also provides easy access to the vulnerability attributes $254a \ldots 254n$ and relationships between the vulnerabilities in text format.

In certain embodiments, the 3D model and connection generator 200 displays connections (i.e., paths) between the 3D models for the vulnerabilities. The 3D model and connection generator 200 displays connections at different anchor points in the vulnerabilities. By showing these connections between vulnerabilities in a 3D model, along with other vulnerability data (e.g., vulnerability scores), the 3D model and connection generator 200 allows users to see networks and systems in a new way, helping to prioritize and remediate vulnerabilities at scale. Thus, the 3D model and connection generator 200 uses the 3D models and connections to integrate vulnerabilities in a larger environment.

In certain embodiments, the vulnerability data $252a \ldots 252n$ is the vulnerability data from the National Vulnerability Database (NVD), which contains the relevant identifier and other vulnerability data for vulnerabilities. This vulnerability data is used to create the vulnerability anchor points for each 3D representation.

In certain embodiments, the vulnerability data $252a \ldots 252n$ includes vulnerability attributes $254a \ldots 254n$, where one or more of the vulnerability attributes $254a \ldots 254n$ may be identified as anchor points. The identified anchor points may be provided as inputs to the generator 220 (or to the 3D modeling tool 240).

In certain embodiments, the vulnerability dashboard 210 is a vulnerability scanner that is used to display the 3D models and connections to the user.

In certain embodiments, the 3D modeler 240 is a 3D modeling utility and ties to the vulnerability data $252a \ldots 252n$ to pull the vulnerability data $252a \ldots 252n$ into a 3D perspective. The vulnerability data $252a \ldots 252n$ may be plugged into the 3D modeler 240 for vulnerability reporting visualization. The 3D modeler 240 integrates with the vulnerability data $252a \ldots 252n$ to take vulnerability attributes $254a \ldots 254n$ and show them as they relate to each other and other systems with the 3D models and connections.

In certain embodiments, the graphing tool 230 (e.g., a data visualization tool or a vulnerability scanner) generates the 3D models and connections and may then plug into the 3D modeler 240 to render the 3D models and connections. In this manner, the 3D modeler 240 is able to display the vulnerabilities in a graphical way.

A user may be described as anyone who wants to view the vulnerabilities in a 3D modeling capacity. For example, a user may be a system administrator, a system or application owner, a security manager, an IT manager or an IT administrator, an organization, etc.).

In certain embodiments, the anchor point of a first vulnerability is used as a component of the 3D model and is used to anchor other vulnerabilities to that first vulnerability. This allows for multiple vulnerabilities to be viewed at a time, as they are related to each other.

Figure 3:
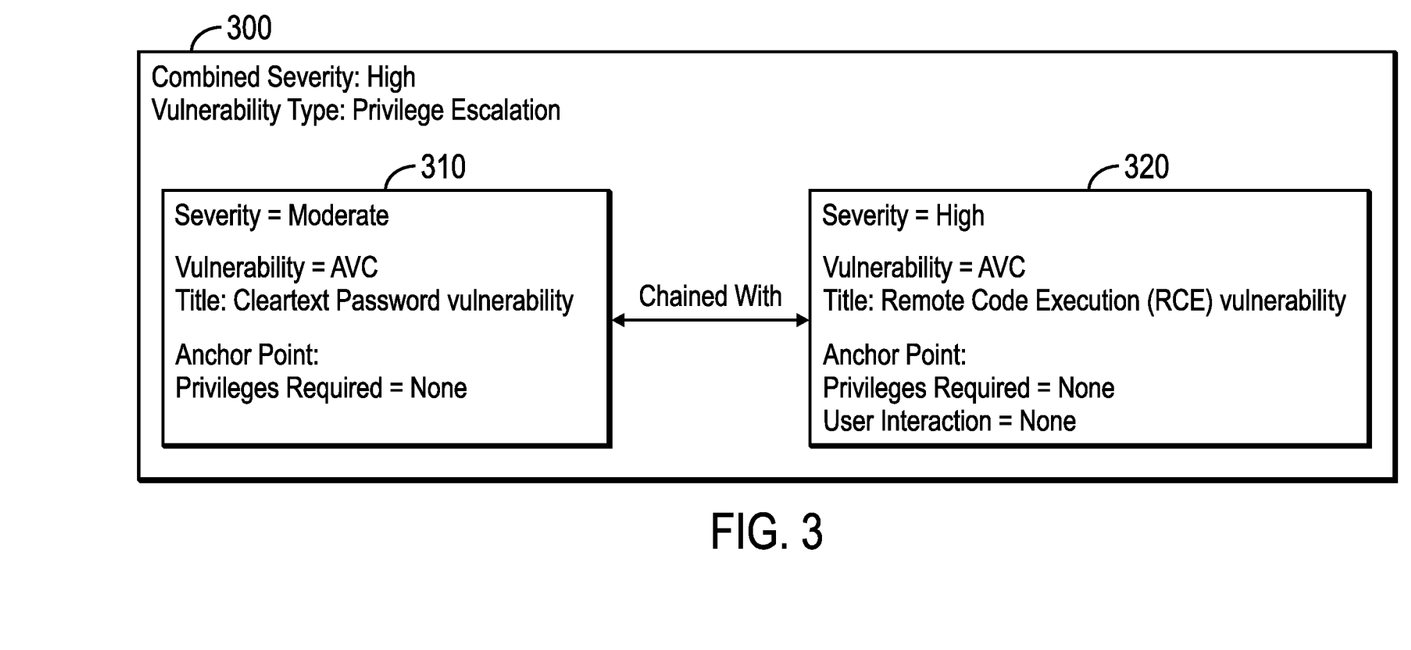
FIG. 3 illustrates a vulnerability chaining example in accordance with certain embodiments.

FIG. 3 illustrates a vulnerability chaining example 300 in accordance with certain embodiments. A chain may be described as connecting vulnerabilities that may be used in combination to access an asset without authorization. In FIG. 3, a 3D model 310 for a first vulnerability has a connection to a 3D model 320 for a second vulnerability. The first vulnerability has a severity of moderate (e.g., an example of a score), while the second vulnerability has a severity of high. The first vulnerability has an anchor point of privileges required=none, and the second vulnerability also has the anchor point of privileges required=none. For these combined vulnerabilities, a combined severity is high, and a vulnerability type is privilege escalation. The connection shown is "chained with", which indicates that the anchor points of the first vulnerability and the second vulnerability are chained to each other. In the example of FIG. 3, the 3D models 310, 320 illustrate that there may be a full system compromise that gives unauthorized access to everything in the system.

Figure 4:
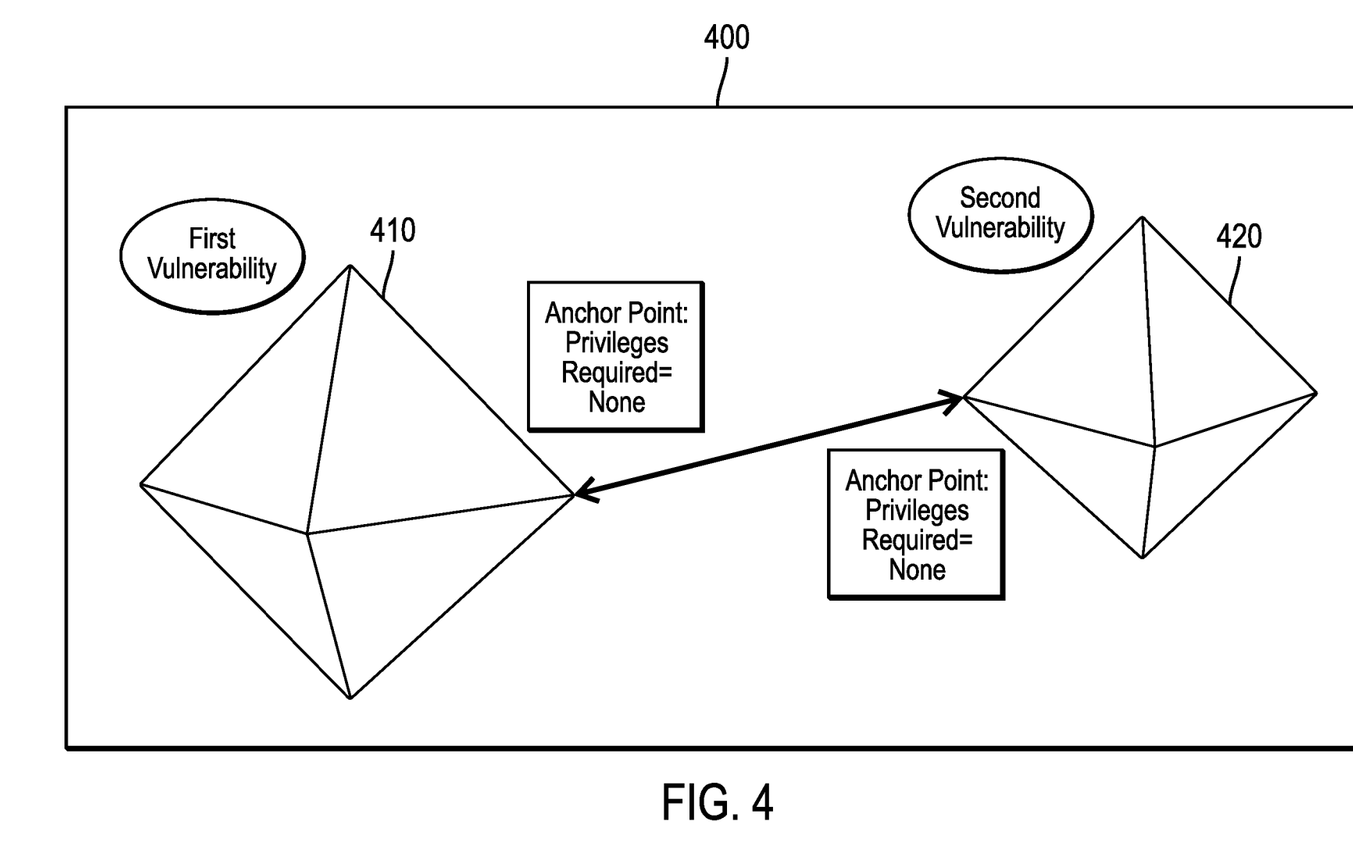
FIG. 4 illustrates another vulnerability chaining example in accordance with certain embodiments.

FIG. 4 illustrates another vulnerability chaining example 400 in accordance with certain embodiments. In FIG. 4, the 3D model 410 for the first vulnerability and the 3D model 420 for the second vulnerability are illustrated as chained (or connected) with the common anchor point of Privileges Required=None.

Figure 5:
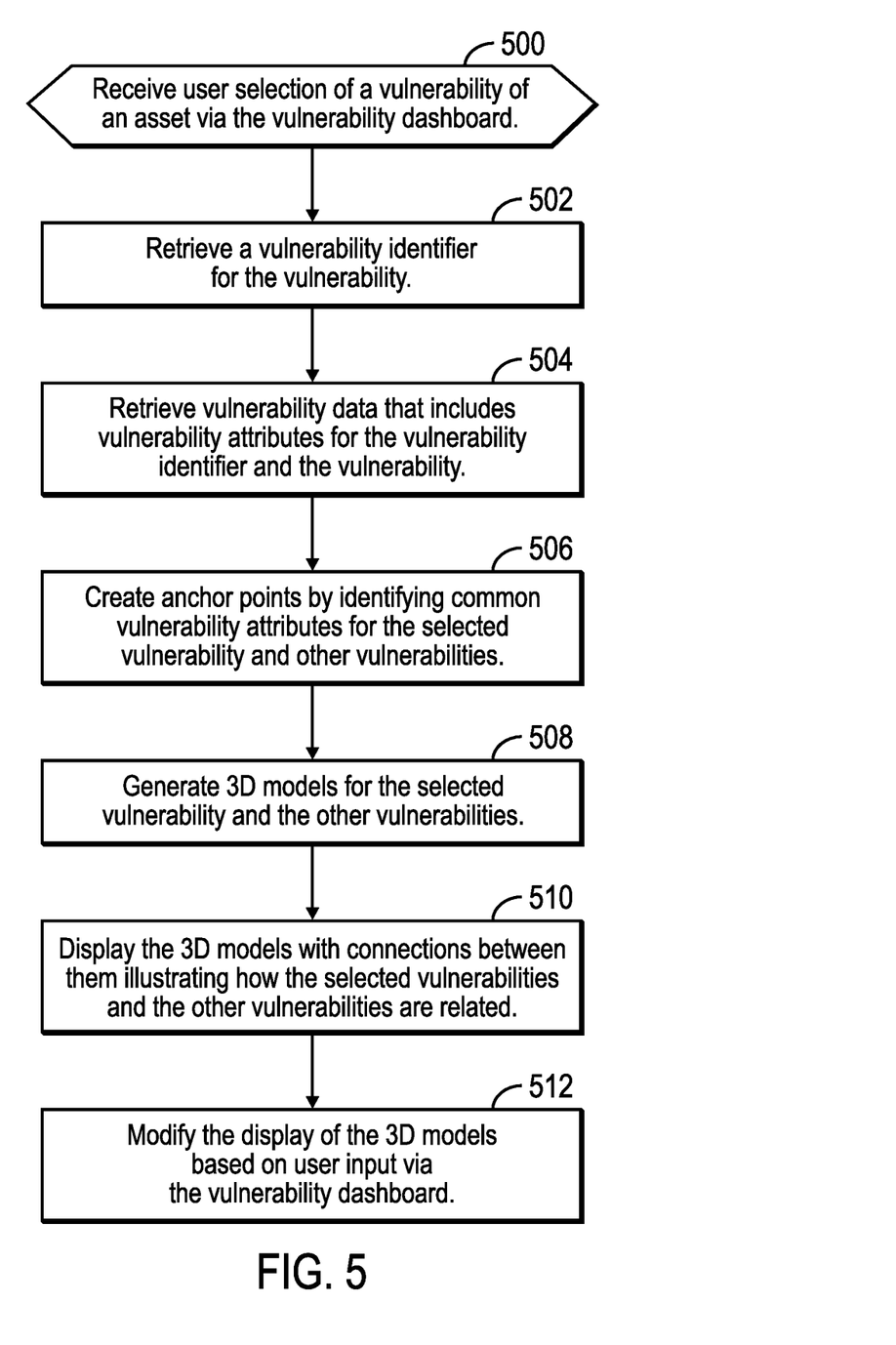
FIG. 5 illustrates, in a flowchart, operations for generating 3D models and connections between the 3D models in accordance with certain embodiments.

FIG. 5 illustrates, in a flowchart, operations for generating 3D models and connections between the 3D models in accordance with certain embodiments. Control begins at block 500 with the generator 220 of the 3D model and connection generator 200 receiving user selection of a vulnerability of an asset via the vulnerability dashboard 210 of the 3D model and connection generator 200. In certain embodiments, the vulnerability dashboard 210 provides a list of vulnerabilities for selection. In certain embodiments, the vulnerability dashboard 210 sends the selection to the generator 220. The asset may be a hardware asset (e.g., a hardware component, such as memory or a processor) or may be a software component (e.g., a software application, an operating system, etc.).

In block 502, the generator 220 retrieves a vulnerability identifier for the vulnerability. In certain embodiments, the vulnerability identifier is a Common Vulnerabilities and Exposures (CVE) Identifier (CVEID) that the generator 220 retrieves from a National Vulnerabilities Database (NVD). In certain embodiments, the CVEID and additional data is retrieved from the National Vulnerabilities Database (NVD) for the vulnerability.

In block 504, the generator 220 retrieves vulnerability data 252a . . . 252n that includes vulnerability attributes 254a . . . 254n for the vulnerability identifier and the vulnerability. The vulnerability attributes 254a . . . 254n may include a vulnerability score. In certain embodiments, the vulnerability score is an Exploit Prediction Scoring System (EPSS) score for the CVEID. In certain embodiments, the vulnerability score is calculated based on vulnerability-based metrics and may range from zero to 10, with zero representing the least severe and 10 representing the most severe.

In block 506, the generator 220 designates anchor points by identifying common vulnerability attributes 254a . . . 254n for the selected vulnerability and other vulnerabilities. The common data may be stored in the vulnerability data 252a . . . 252n, which includes vulnerabilities, vulnerability identifiers, anchor points, and other data for the vulnerabilities. Then, the generator 220 identifies certain anchor points 270 for use in the 3D models.

In block 508, the generator 220 generates 3D models for the selected vulnerability and the other vulnerabilities.

In block 510, the generator 220 displays the 3D models with connections between them illustrating how the selected vulnerabilities and the other vulnerabilities are related.

In block 512, the generator 220 modifies the display of the 3D models based on user input via the vulnerability dashboard 210. For example, the 3D models may be moved on the display with respect to each other, individually rotated, repositioned, etc. This is especially helpful when there are a large number of 3D models displayed.

In certain embodiments multiple vulnerabilities are selected, and the generator 220 generates a 3D model for the multiple vulnerabilities.

Figure 6:
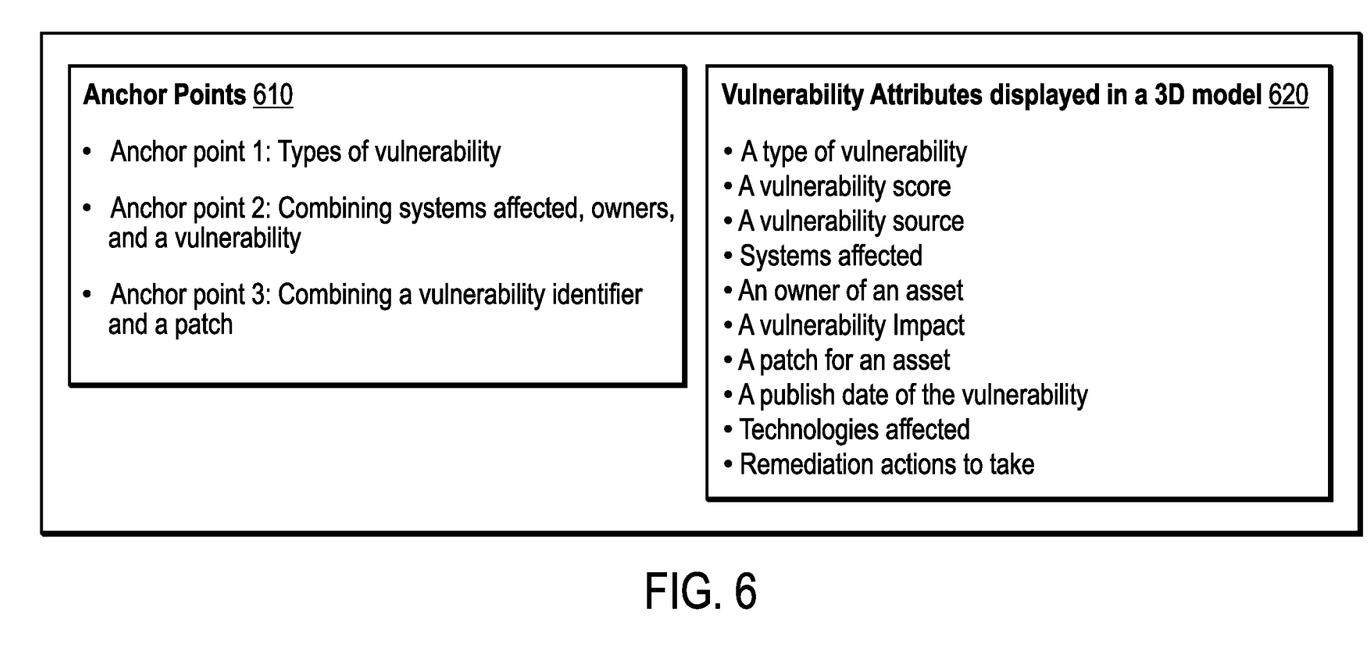
FIG. 6 illustrates example anchor points and vulnerability attributes displayed in a 3D model in accordance with certain embodiments.

FIG. 6 illustrates example anchor points 610 and vulnerability attributes 620 displayed in a 3D model in accordance with certain embodiments. A first example of an anchor point may be types of vulnerability. A second example of an anchor point may be combining a type of the system, owners, and the vulnerability. A third example of an anchor point may be combining the vulnerability identifier and patch information (e.g., code to fix a security vulnerability).

Examples of the vulnerability attributes that may be displayed with the 3D models include: a type of vulnerability, a vulnerability score, a vulnerability source, systems affected, an owner of the asset, a vulnerability impact, a patch of the asset (e.g., a software patch), a publish date of the vulnerability, technologies affected and remediation actions to take.

In certain embodiments, a user has an environment with over 3,000 unique vulnerabilities. It is difficult for the user to determine how impactful these vulnerabilities are without understanding their exploitability, likelihood, and impact based on the vulnerability score alone. With embodiments, the user uses the vulnerability dashboard 210 to view a 3D model of exploitable vulnerabilities to determine possible impact on the environment. In certain embodiments, the vulnerability scores are not weighted per organizational risk, while in other embodiments, the vulnerability scores are weighted per organizational risk.

The generator 220 provides the 3D model to help the user visualize the type of vulnerability, the impact of the vulnerability to the organization, and potential ties to other vulnerabilities displayed with connections. The connections represent how vulnerabilities may be tied together.

Figure 7:
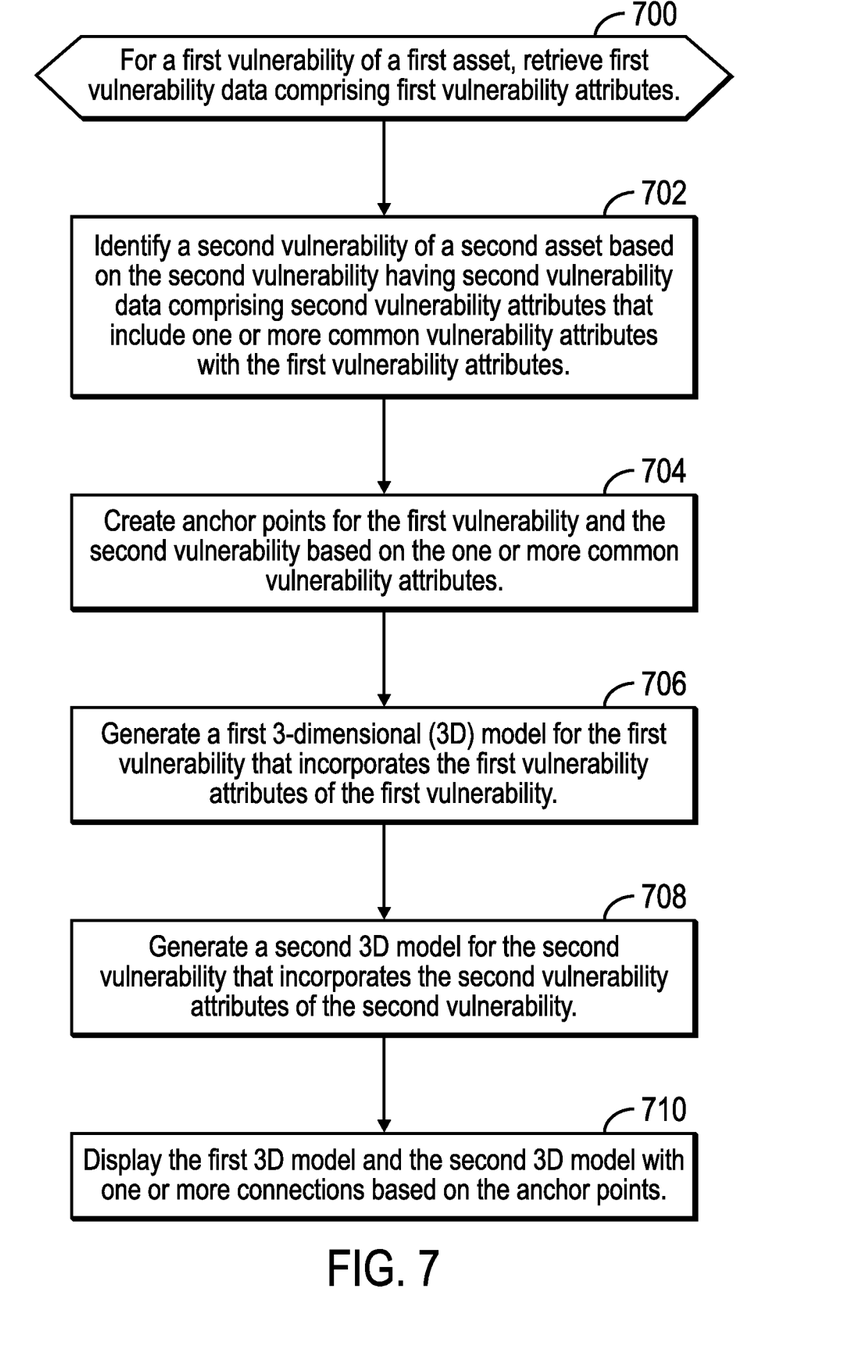
FIG. 7 illustrates, in a flowchart, operations for contextual vulnerability modeling in accordance with certain embodiments.

FIG. 7 illustrates, in a flowchart, operations for contextual vulnerability modeling in accordance with certain embodiments. Control begins at block 700 with the 3D model and connection generator 200, for a first vulnerability of a first asset, retrieving first vulnerability data comprising first vulnerability attributes. In certain embodiments, the 3D model and connection generator 200 receives selection of a vulnerability (e.g., a name or identifier of the vulnerability) via the vulnerability dashboard 210 and uses that vulnerability to retrieve vulnerability data 252a . . . 252n. In certain other embodiments, the selected vulnerability is mapped to a vulnerability identifier, and the vulnerability identifier is used to retrieve the vulnerability data 252a . . . 252n.

In block 702, the 3D model and connection generator 200 identifies a second vulnerability of a second asset based on the second vulnerability having second vulnerability data comprising second vulnerability attributes that include one or more common vulnerability attributes with the first vulnerability attributes.

In block 704, the 3D model and connection generator 200 creates anchor points for the first vulnerability and the second vulnerability based on the one or more common vulnerability attributes. In certain embodiments, creating the anchor points includes identifying the anchor points and determining placement of the anchor points on the 3D models.

In block 706, the 3D model and connection generator 200 generates a first 3-dimensional (3D) model for the first vulnerability that incorporates the first vulnerability attributes of the first vulnerability. In certain embodiments, the first 3D model incorporating the first vulnerability attributes includes a geometric dimension corresponding to each first vulnerability attribute, and a magnitude of each geometric dimension depends on a magnitude of the corresponding first vulnerability attribute.

In block 708, the 3D model and connection generator 200 generates a second 3D model for the second vulnerability that incorporates the second vulnerability attributes of the second vulnerability. In certain embodiments, the second 3D model incorporating the second vulnerability attributes includes a geometric dimension corresponding to each second vulnerability attribute, and a magnitude of each geometric dimension depends on a magnitude of the corresponding second vulnerability attribute.

In block 710, the 3D model and connection generator 200 displays the first 3D model and the second 3D model with one or more connections based on the anchor points. In certain embodiments, the 3D model and connection generator 200 also displays the first vulnerability attributes of the first vulnerability represented by the first 3D model and displays the second vulnerability attributes of the second vulnerability represented by the second 3D model.

In certain embodiments, the 3D model and connection generator 200 uses 3D modeling technology along with EPSS values to determine anchor points within each vulnerability. In certain embodiments, each vulnerability is associated with a CVEID and other data within the National Vulnerability Database (NVD) (i.e., an example of vulnerability data 252a . . . 252n). Once the 3D model and connection generator 200 retrieves the CVEID and other data for each vulnerability from the National Vulnerability Database (NVD), the 3D model and connection generator 200 uses the EPSS scoring metric for each vulnerability to create an anchor point for that vulnerability within the 3D model. The 3D model and connection generator 200 generates the 3D model to provide a visual representation of each vulnerability.

Because every person learns and digests the vulnerability data 252a . . . 252n in a different way, having a text-only approach to vulnerability scoring and methodologies makes it difficult to determine how much context each person gets out of vulnerability data 252a . . . 252n, and so the 3D model and connection generator 200 provides 3D models and connections to provide visual context (i.e., how different vulnerabilities are related to each other) for vulnerabilities. The 3D model and connection generator 200 allows for proper understanding of vulnerability context, which enables appropriate prioritization and remediation activities for secure networks and systems. With the increasing complexity of systems (e.g., using containers, multi-cloud deployments, open-source software implementations, Application Programming Interfaces (APIs), connectivity between cloud environments, and network intricacies), the 3D model and connection generator 200 provides a better and less complex way to view vulnerabilities.

The vulnerability data 252a . . . 252n in text form may be cumbersome, which may lead to users reviewing, for example, the vulnerability score and leaving the rest of the information left unread. However, the 3D model and connection generator 200 provides a visualization of the vulnerabilities and vulnerability data 252a . . . 252n to allow for more vulnerability data 252a . . . 252n to be consumed efficiently.

In certain embodiments, the 3D model and connection generator 200 leverages 3D modeling techniques to enhance the comprehension and visualization of vulnerabilities. This improves current techniques that allow vulnerabilities to be viewed in a printed text format or on a website. The 3D model and connection generator 200 allows vulnerabilities to be viewed in a holistic and connected context. By leveraging 3D modeling technology, vulnerability scores, and vulnerability data 252a . . . 252n, the 3D model and connection generator 200 allows visualizing vulnerabilities in new ways. This allows for users who are more visual learners, or do not have time to read text on vulnerabilities, to comprehend vulnerability attributes 254a . . . 254n in a different and more compact way.

In certain embodiments, the 3D model and connection generator 200 uses 3D models and connections to enable viewing and interpretation of vulnerability data 252a . . . 252n. Unlike vulnerability metrics and scoring systems that use a purely quantitative approach, leaving it difficult for IT and security practitioners to understand vulnerabilities in depth, embodiments provide 3D models and connections to provide vulnerabilities in context. Instead of applying a "patch everything" approach, since embodiments provide a deeper understanding and more context around vulnerability scoring and quantifications, users are able to resolve specific vulnerabilities.

Instead of looking at vulnerabilities in the NVD or by vulnerability score, the 3D model and connection generator 200 provides a visualization that allows users to determine how critical or severe a vulnerability actually is to an environment. Adding context to the vulnerabilities by visualization helps users make vulnerability management simpler and allows users to determine where issues may be in their environment. In certain embodiments, the 3D model and connection generator 200 identifies new patterns showing how different vulnerabilities are connected (e.g., how software (e.g., operating system level or software level) and hardware vulnerabilities are connected). In this manner, the 3D model and connection generator 200 illustrates where issues may be in a computing system for a user.

In certain embodiments, the 3D model and connection generator 200 receives a set of vulnerability data pertaining to a software asset, the set of vulnerability data including at least two vulnerability identifiers (IDs), each vulnerability ID is associated with vulnerability data 252a . . . 252n having a set of vulnerability attributes 254a . . . 254n. The 3D model and connection generator 200 generates, by a 3D modeler 240, a 3D model for each of the at least two vulnerability IDs, where the 3D models incorporate the set of vulnerability attributes 254a . . . 254n of each vulnerability ID into each 3D model. The 3D model and connection generator 200 generates anchor points (e.g., connections) between the 3D models for each of the at least two vulnerability IDs, the anchor points being shared vulnerability attributes 254a . . . 254n of the set of vulnerability attributes 254a . . . 254n for each of the at least two vulnerability IDs.

In certain embodiments, the vulnerability attributes 254a . . . 254n of each vulnerability ID include at least one selected from a group consisting of: a type of vulnerability, a vulnerability score, a vulnerability source, systems affected by the vulnerability, an owner of the software asset, a vulnerability impact, a patch of the software asset, a publish date of the vulnerability, and remediation actions to take.

In certain embodiments, each 3D model incorporates the set of vulnerability attributes 254a . . . 254n by including a geometric dimension corresponding to each vulnerability attribute 254a . . . 254n, where a magnitude of each geometric dimension depends on a magnitude of the corresponding vulnerability attribute 254a . . . 254n. In certain embodiments, a magnitude of a geometric dimension may be a size of the 3D model in a particular direction (dimension) that reflects a magnitude (e.g., a severity, an importance or a rank) of the corresponding vulnerability attribute 254a . . . 254n. In certain embodiments, the size and shape of the 3D model may change based on the severity of the one or more vulnerability attributes 254a . . . 254n or based on concern regarding the one or more vulnerability attributes 254a . . . 254n.

The terms "an embodiment", "embodiment". "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

In certain embodiments, the vulnerability data 252a . . . 252n includes vulnerability attributes 254a . . . 254n, where one or more of the vulnerability attributes 254a . . . 254n may be identified as anchor points. The identified anchor points may be provided as inputs to the generator 220 (or to the 3D modeler 240).

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:

for a first vulnerability of a first asset, retrieving first vulnerability attributes including a first score for the first vulnerability;

determining one or more common vulnerability attributes between the first vulnerability attributes of the first vulnerability and second vulnerability attributes of a second vulnerability of a second asset including a second score for the second vulnerability using stored vulnerability data;

creating anchor points for the first vulnerability and the second vulnerability based on the one or more common vulnerability attributes;

generating a first 3-dimensional (3D) model for the first vulnerability that incorporates the first vulnerability attributes of the first vulnerability using the anchor points;

generating a second 3D model for the second vulnerability that incorporates the second vulnerability attributes of the second vulnerability using the anchor points;

displaying, in a vulnerability dashboard, the first 3D model and the second 3D model with one or more connections between the anchor points and with the first vulnerability attributes and the second vulnerability attributes; and in response to receiving input, modifying the displaying of the first 3D model and the second 3D model by moving one of the first 3D model and the second 3D model individually in the vulnerability dashboard.

2. The computer-implemented method of claim 1, wherein the first vulnerability attributes and the second vulnerability attributes each include at least one vulnerability attribute selected from a group consisting of: a type of vulnerability, the vulnerability score, a vulnerability source, systems affected, an owner, a vulnerability impact, a patch, a publish date, and remediation actions to take.

3. The computer-implemented method of claim 1, wherein the first 3D model incorporating the first vulnerability attributes includes a geometric dimension corresponding to each of the first vulnerability attributes, and wherein a magnitude of each geometric dimension depends on the magnitude of the corresponding first vulnerability attribute.

4. The computer-implemented method of claim 1, wherein the second 3D model incorporating the second vulnerability attributes includes a geometric dimension corresponding to each of the second vulnerability attributes, and wherein a magnitude of each geometric dimension depends on the magnitude of the corresponding second vulnerability attribute.

5. The computer-implemented method of claim 1, wherein moving at least one of the first 3D model and the second 3D model individually in the vulnerability dashboard comprises individually rotating or individually repositioning.

6. The computer-implemented method of claim 1, wherein a third 3D model is generated for a plurality of vulnerabilities.

7. The computer-implemented method of claim 1, wherein the first asset and the second asset are each selected from a group consisting of: a hardware asset and a software asset.

8. A computer program product, the computer program product comprising a computer readable storage medium having program instructions embodied therewith, the program instructions executable by a processor to cause the processor to perform operations for:
   for a first vulnerability of a first asset, retrieving first vulnerability attributes including a first score for the first vulnerability;
   determining one or more common vulnerability attributes between the first vulnerability attributes of the first vulnerability and second vulnerability attributes of a second vulnerability of a second asset including a second score for the second vulnerability using stored vulnerability data;
   creating anchor points for the first vulnerability and the second vulnerability based on the one or more common vulnerability attributes;
   generating a first 3-dimensional (3D) model for the first vulnerability that incorporates the first vulnerability attributes of the first vulnerability using the anchor points;
   generating a second 3D model for the second vulnerability that incorporates the second vulnerability attributes of the second vulnerability using the anchor points;
   displaying, in a vulnerability dashboard, the first 3D model and the second 3D model with one or more connections between the anchor points and with the first vulnerability attributes and the second vulnerability attributes; and
   in response to receiving input, modifying the displaying of the first 3D model and the second 3D model by moving one of the first 3D model and the second 3D model individually in the vulnerability dashboard.

9. The computer program product of claim 8, wherein the first vulnerability attributes and the second vulnerability attributes each include at least one vulnerability attribute selected from a group consisting of: a type of vulnerability, the vulnerability score, a vulnerability source, systems affected, an owner, a vulnerability impact, a patch, a publish date, and remediation actions to take.

10. The computer program product of claim 8, wherein the first 3D model incorporating the first vulnerability attributes includes a geometric dimension corresponding to each of the first vulnerability attributes, and wherein a magnitude of each geometric dimension depends on the magnitude of the corresponding first vulnerability attribute.

11. The computer program product of claim 8, wherein the second 3D model incorporating the second vulnerability attributes includes a geometric dimension corresponding to each of the second vulnerability attributes, and wherein a magnitude of each geometric dimension depends on the magnitude of the corresponding second vulnerability attribute.

12. The computer program product of claim 8, wherein moving at least one of the first 3D model and the second 3D model individually in the vulnerability dashboard comprises individually rotating or individually repositioning.

13. The computer program product of claim 8, wherein a third 3D model is generated for a plurality of vulnerabilities.

14. The computer program product of claim 8, wherein the first asset and the second asset are each selected from a group consisting of: a hardware asset and a software asset.

15. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
   for a first vulnerability of a first asset, retrieving first vulnerability attributes including a first score for the first vulnerability;
   determining one or more common vulnerability attributes between the first vulnerability attributes of the first vulnerability and second vulnerability attributes of a second vulnerability of a second asset including a second score for the second vulnerability using stored vulnerability data;
   creating anchor points for the first vulnerability and the second vulnerability based on the one or more common vulnerability attributes;
   generating a first 3-dimensional (3D) model for the first vulnerability that incorporates the first vulnerability attributes of the first vulnerability using the anchor points;
   generating a second 3D model for the second vulnerability that incorporates the second vulnerability attributes of the second vulnerability using the anchor points;
   displaying, in a vulnerability dashboard, the first 3D model and the second 3D model with one or more connections between the anchor points and with the first vulnerability attributes and the second vulnerability attributes; and
   in response to receiving input, modifying the displaying of the first 3D model and the second 3D model by moving one of the first 3D model and the second 3D model individually in the vulnerability dashboard.

16. The computer system of claim 15, wherein the first vulnerability attributes and the second vulnerability attributes each include at least one vulnerability attribute selected from a group consisting of: a type of vulnerability, the vulnerability score, a vulnerability source, systems affected, an owner, a vulnerability impact, a patch, a publish date, and remediation actions to take.

17. The computer system of claim 15, wherein the first 3D model incorporating the first vulnerability attributes includes a geometric dimension corresponding to each of the first vulnerability attributes, and wherein a magnitude of each geometric dimension depends on the magnitude of the corresponding first vulnerability attribute.

18. The computer system of claim 15, wherein the second 3D model incorporating the second vulnerability attributes includes a geometric dimension corresponding to each of the second vulnerability attributes, and wherein a magnitude of each geometric dimension depends on the magnitude of the corresponding second vulnerability attribute.

19. The computer system of claim 15, wherein moving at least one of the first 3D model and the second 3D model individually in the vulnerability dashboard comprises individually rotating or individually repositioning.

20. The computer system of claim 15, wherein a third 3D model is generated for a plurality of vulnerabilities.

\* \* \* \* \*